United States Patent
Noth et al.

(10) Patent No.: US 8,600,803 B1
(45) Date of Patent: Dec. 3, 2013

(54) INCENTIVIZING BEHAVIOR TO ADDRESS PRICING, TAX, AND CURRENCY ISSUES IN AN ONLINE MARKETPLACE FOR DIGITAL GOODS

(75) Inventors: Michael Noth, Bothell, WA (US); Chee Heng Chew, Redmond, WA (US); Erik Kay, Belmont, CA (US); Alexandra Levich, Seattle, WA (US); Zhenhai Lin, Redmond, WA (US); Rahul Roy-Chowdhury, Redwood City, CA (US)

(73) Assignee: Google Inc., Mountain View, CA (US)

( * ) Notice: Subject to any disclaimer, the term of this patent is extended or adjusted under 35 U.S.C. 154(b) by 368 days.

(21) Appl. No.: 13/110,903

(22) Filed: May 18, 2011

Related U.S. Application Data

(60) Provisional application No. 61/345,999, filed on May 18, 2010, provisional application No. 61/346,000, filed on May 18, 2010, provisional application No. 61/346,013, filed on May 18, 2010.

(51) Int. Cl.
*G06Q 30/00* (2012.01)

(52) U.S. Cl.
USPC .......................................... 705/14.1

(58) Field of Classification Search
USPC ........................................ 705/14.1
See application file for complete search history.

(56) References Cited

U.S. PATENT DOCUMENTS 7,830,915 B2 * 11/2010 Moskowitz .................. 370/468

* cited by examiner

*Primary Examiner* — Daniel Lastra
(74) *Attorney, Agent, or Firm* — Brake Huges Bellermann LLP

(57) ABSTRACT

An online marketplace is provided to merchants of digital goods that may be downloaded from the marketplace to a client computing device for execution. A request is received from a party to the marketplace to list a digital good for sale in the marketplace. A primary price for the digital good is received. An opt-in service is offered that includes determining one or more derivative prices associated with the digital good, collecting the one or more derivative prices from a buyer of the digital good, and paying an amount based on the one or more derivative prices to the party to the marketplace. An incentive is provided to the party to accept the offer. After acceptance of the offer by the party, the derivative prices associated with the digital good are determined, the derivative prices are collected from a buyer of the digital good, and the amount based on the one or more derivative prices is paid to the party to the marketplace.

20 Claims, 10 Drawing Sheets

INCENTIVIZING BEHAVIOR TO ADDRESS PRICING, TAX, AND CURRENCY ISSUES IN AN ONLINE MARKETPLACE FOR DIGITAL GOODS

CROSS REFERENCE TO RELATED APPLICATIONS

This application claims the benefit, under 35 U.S.C. §119, of U.S. Provisional Patent Application No. 61/345,999, U.S. Provisional Patent Application No. 61/346,000 and U.S. Provisional Patent Application No. 61/346,013, all filed May 18, 2010. The disclosures of these provisional patent applications are incorporated herein by reference in their entirety.

TECHNICAL FIELD

This disclosure relates to software applications and, in particular, to the conversion of a free version of an application to a paid version of the application.

BACKGROUND

Digital goods, such as installable software applications, including for example installable web applications and browser extensions can be offered to users in an online marketplace. When digital goods are offered for sale in a marketplace the goods can be listed and priced by a developer of the goods, and the marketplace can offer a form to the developer within which many users can discover the developer's goods. In addition, the marketplace can collect payment for the goods from purchasers and then can pass on the payment to the developer of the digital goods.

A store operating as a marketplace has many desirable properties compared to a store operating as a seller of record or as a reseller, in which the reseller purchases goods from developers and resells them at a price determined by the reseller. A marketplace operator may have less liability for the performance of the goods that are sold and has the opportunity to be more inclusive of goods that can be offered in the marketplace. However, a reseller model often can lead to a better user experience, because the reseller has more control over the manner in which the goods are offered to purchasers and can offer a more uniform experience to purchasers.

SUMMARY

In a general aspect, a method includes providing an online marketplace to merchants of digital goods that may be downloaded from the marketplace to a client computing device for execution by the client device. A request is received from a party to the marketplace to list a digital good for sale in the marketplace. A primary price for the digital good for sale in the marketplace is received. An opt-in service is offered, where the opt-in service includes determining one or more derivative prices associated with the digital good, where the derivative prices are derived from the primary price, collecting the one or more derivative prices from a buyer of the digital good, and paying an amount based on the one or more derivative prices to the party to the marketplace. An incentive is provided to the party to accept the offer. After acceptance of the offer by the party, the one or more derivative prices associated with the digital good are determined, the one or more derivative prices are collected from a buyer of the digital good, and the amount based on the one or more derivative prices is paid to the party to the marketplace.

In another general aspect, a tangible computer-readable storage medium has recorded and stored thereon instructions that, when executed by one or more processors of a computer system cause the computer system to provide an online marketplace to merchants of digital goods that may be downloaded from the marketplace to a client computing device for execution by the client device, receive a request from a party to the marketplace to list a digital good for sale in the marketplace, and receive a primary price for the digital good for sale in the marketplace. The computer system is further caused to offer an opt-in service of determining one or more derivative prices associated with the digital good, where the derivative prices are derived from the primary price, of collecting the one or more derivative prices from a buyer of the digital good, and of paying an amount based on the one or more derivative prices to the party to the marketplace. The computer system is further caused to provide an incentive to the party to accept the offer. The computer system is further caused to, after acceptance of the offer by the party: determine the one or more derivative prices associated with the digital good; collect the one or more derivative prices from a buyer of the digital good; and pay the amount based on the one or more derivative prices to the party to the marketplace.

In another general aspect, a system includes one or more memory devices arranged and configured to store executable code and one or more processors operably coupled to the one or more memory devices. The processors are arranged and configured to execute the code such that the apparatus performs the actions of providing an online marketplace to merchants of digital goods that may be downloaded from the marketplace to a client computing device for execution by the client device, receiving a request from a party to the marketplace to list a digital good for sale in the marketplace, and receiving a primary price for the digital good for sale in the marketplace. The processors are further arranged and configured to execute the code such that the apparatus performs the actions of offering an opt-in service of determining one or more derivative prices associated with the digital good, where the derivative prices are derived from the primary price, of collecting the one or more derivative prices from a buyer of the digital good, of paying an amount based on the one or more derivative prices to the party to the marketplace, and of providing an incentive to the party to accept the offer. The processors are arranged and configured to execute the code such that the apparatus performs the actions of, after acceptance of the offer by the party: determining the one or more derivative prices associated with the digital good; collecting the one or more derivative prices from a buyer of the digital good; and paying the amount based on the one or more derivative prices to the party to the marketplace.

Implementations can include one or more of the following features. For example, the derivative price can include a sales tax or a price in a second currency other than a first currency of the primary price. The price in the second currency (P2) can be based on the primary price (P1) and a current foreign exchange conversion rate between the first and second currency (R), where an absolute value of a difference between P2 and R*P1 is greater than a significant digit used in prices of the second currency. The last two digits of the price in the second currency can be determined to be "99" or "49." At least one of the one or more derivative prices can be based, at least in part, on prices of other digital goods offered in the marketplace.

The incentive can include offering to boost a ranking of the digital good in the marketplace, or offering to pay a higher percentage of the primary price to the party or a higher percentage of the one or more derivative prices to the party when the digital good is sold in the marketplace.

The details of one or more implementations are set forth in the accompanying drawings and the description below. Other features will be apparent from the description and drawings, and from the claims.

DETAILED DESCRIPTION

Figure 1:
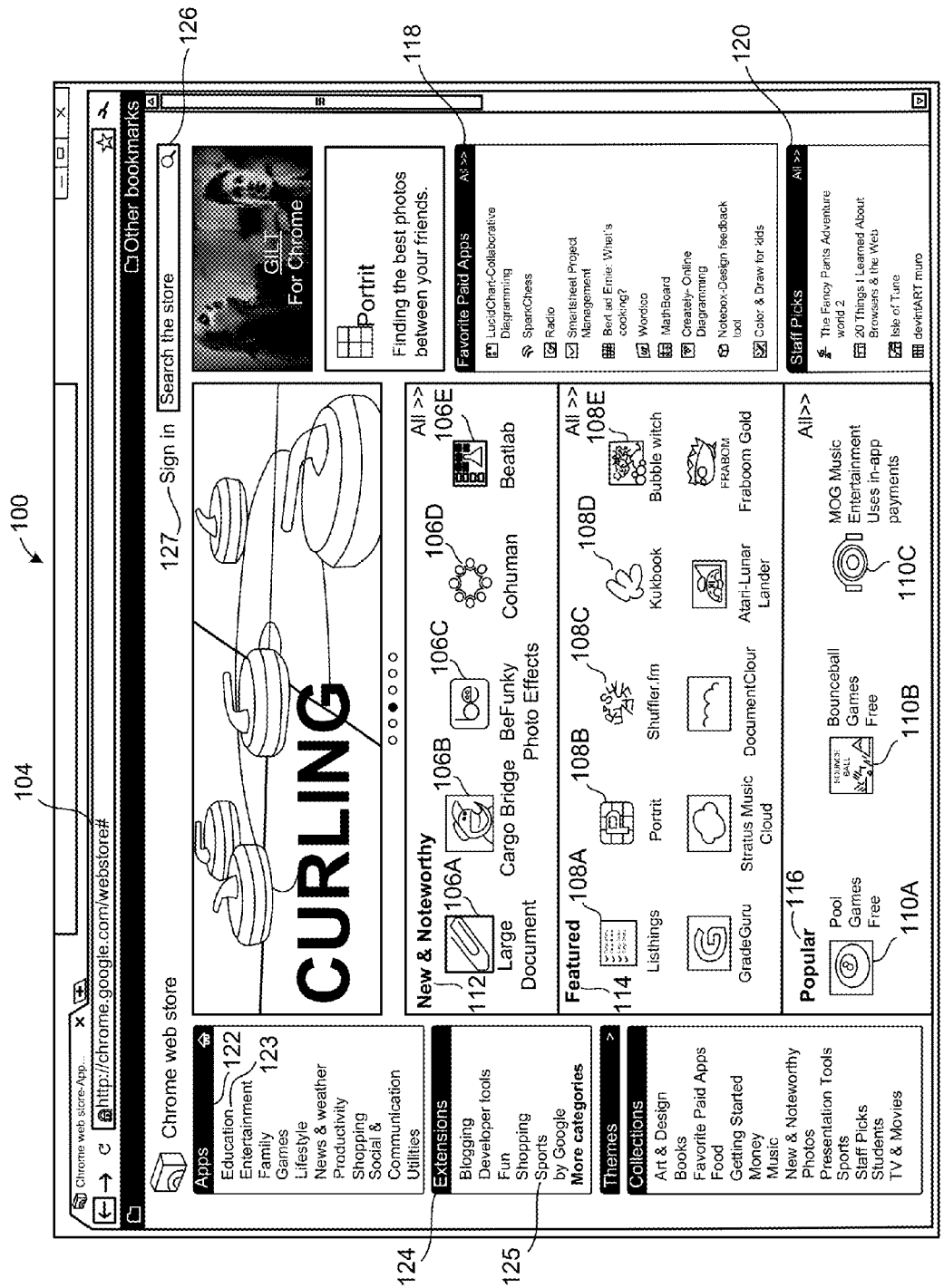
FIG. 1 is a screenshot of the user interface to a marketplace of digital goods.

FIG. 1 is a screenshot of a user interface 100 to a marketplace of digital goods. The user interface 100 can be displayed by a browser application that is executed by a computing device that may be connected to a network (e.g., the Internet). The browser application can open one or more tabs 102, one of which may display the user interface to the marketplace when a user navigates to a webpage identified by a uniform resource locator (URL) that provides content to the browser so that the browser can display the user interface to the marketplace in the tab.

The content provided by the webpage to the user can include a plurality of icons 106A, 106B, 106C, 106D, 106E, 106F, 108A, 108B, 108C, 108D, 108E, 110A, 110B, 110C that represent digital goods that can be downloaded from the webpage by the user for execution by a computing device controlled by the user. In one implementation, the digital goods can include applications that can be downloaded from the marketplace to a client computing device where they can be installed on the computing device for execution by a browser running on the computing device. Such applications can be known as "installable web applications," because they are downloadable from the World Wide Web and may be able to access the World Wide Web when executing in the browser. Thus, the installable web applications may not run natively on the computing device after they have been downloaded, but rather they may be executed through a browser that runs on the computing device.

Within the user interface 100, the installable web applications can be displayed in a manner that is organized to help a user decide which applications may be useful or relevant to the user. For example, the user interface 100 can include a category 112 of applications 106A, 106B, 106C, 106D, 106E, 106F that have been recently released in the marketplace and which a curator of the marketplace may deem to be especially noteworthy to users. In one implementation, the applications 106A, 106B, 106C, 106D, 106E, 106F shown in the category 112 can be limited to applications that have been released in the marketplace within a recent period of time (e.g. one week, one month, three months, six months). Then, a subset of the applications that have been released into the marketplace within the recent period of time can be selected based on a variety of signals that indicate the noteworthiness of the selected applications to the user, and the selected subset of applications 106A, 106B, 106C, 106D, 106E, 106F can be displayed within the category 112. That is, the applications 106A, 106B, 106C, 106D, 106E, 106F shown in the New and Noteworthy category 112 of the user interface 100 can be a subset of a larger number of applications that also could qualify as being new and noteworthy but which have not been selected for display in the user interface 100. A variety of signals that can be used to rank and select the subset of applications as described in more detail below.

In another example, the user interface 100 can include a category 114 of applications 108A, 108B, 108C, 108D, 108E that have been selected to be featured for display in the user interface 100. The applications 108A, 108B, 108C, 108D, 108E that are selected to be featured in the category 114 can be selected based on criteria evaluated by a curator of the market place. For example, the curator may select the applications 108A, 108B, 108C, 108D, 108E for display in the category 114 from a much larger set of applications based on the curator's opinion of the quality, popularity, or utility of the selected applications. In another implementation, the curator may select the applications 108A, 108B, 108C, 108D, 108E based upon payments made by developers of the applications in return for prominent display of the applications in the user interface 100.

In another example, the user interface 100 can include a category 116 of applications 110A, 110B, 110C that have been selected for display in the category 116 of the user interface 100 based on a popularity ranking of the selected applications relative to other applications. The popularity ranking can be determined based on reviews of the applications by users who have downloaded and used the applications. For example, the marketplace may request that users rate applications quantitatively using a system of one to five stars, where five stars is the highest rating, and one star is the lowest rating. Then, applications within the marketplace can be ranked based on their user rating. In one implementation, applications with the highest average rating can be ranked highest. In another implementation, applications with the highest number of five-star ratings can be ranked highest. Then, applications 110A, 110B, 110C with the highest rankings can be selected for display in the user interface 100 of the marketplace.

The user interface 100 of the marketplace also can include categories of applications in other subportions of the user interface 100 in which smaller icons are used to represent the applications that are used in categories 112, 114, 116. For example, category 118 can display "Favorite Paid Apps," which can be applications for which a user must pay money before being able to download and install the application on the user's computing device. Applications listed in the Favorite Paid Apps category 118 can be the most frequently downloaded and/or most frequently installed applications for which the user must pay money. In another example, category 120 can display "Staff Picks," which can be applications that are selected by a curator at the marketplace based on the selected applications being deemed especially interesting to users who visit the marketplace in search of applications.

Within the user interface 100, categories 112, 114, 116, 118, 120 can display a subset of applications that are categorized to fall within the category. Because screen space within the user interface is limited, only a subset of the applications that fall within a category may be displayed within the user interface 100. However, by selecting a hyperlink associated with the category, more applications that fall within the category can be displayed to a user. For example, each category 112, 114, 116, 118, 120 is associated with a hyperlink labeled "All," the selection of which may cause more applications that fall within the category to be displayed.

Other parts of the user interface 100 also can be used to organize the digital goods that are available in the marketplace. For example, an "Apps" section 122 can provide a list of hyperlinks, which each can be selected to display applications that belong to a category identified by the hyperlink. For example, selection of the "Education" hyperlink 123 can cause a group of icons that represent applications related to educational topics to be displayed. In another example, an "Extensions" section 124 can provide a list of hyperlinks, which each can be selected to display extensions that belong to a category identified by the hyperlink, where an extension is executable code that extends the functionality of a browser. For example, selection of the "Sports" hyperlink 125 can cause a group of icons that represent extensions related to sports topics to be displayed.

In addition to locating digital goods (e.g., Web applications and extensions) that are already displayed within a category 112, 114, 116, 118, 120 of the user interface 100 what it could be displayed as a result of selecting a hyperlink 113, 123, 125, digital goods also can be located as a result of a query for goods that may be of interest to the user. For example, a user may enter query terms into a query box 126 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 100.

The user interface 100 also includes a hyperlink 127 that can be selected so that the user can log into the marketplace. For example, selection of the hyperlink 127 can trigger the display of a prompt to the user to enter a username and password, and successful entry of the username and password may allow the user to log into a personal account associated the marketplace. As explained in more detail below, once the user is logged into the marketplace, digital goods can be selected and presented to the user within the user interface 100, where the selection of the goods can be personalized to the user based on data associated with the user's account.

Figure 2:
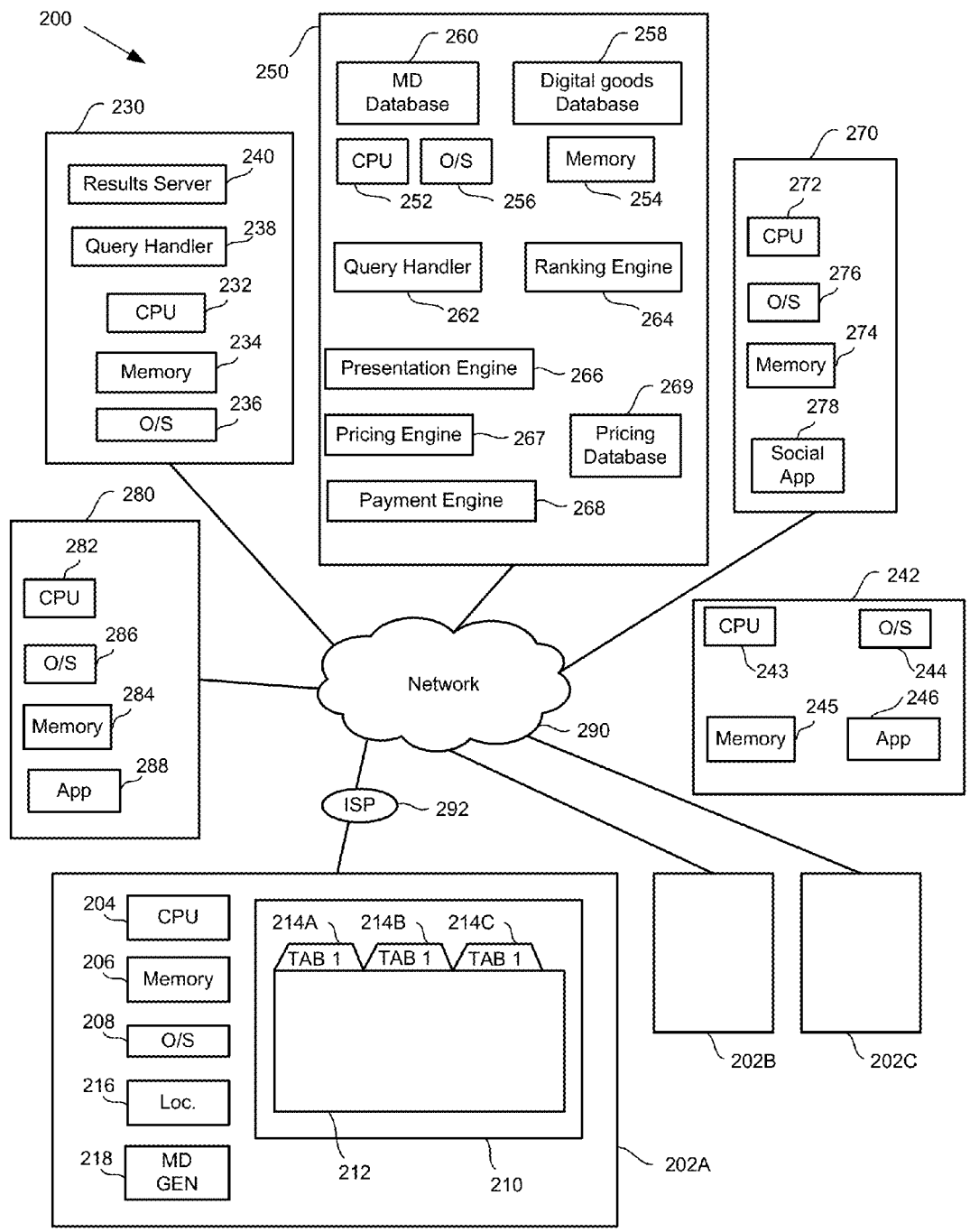
FIG. 2 is a schematic block diagram of an example embodiment of a system 200 for use with the techniques described herein.

FIG. 2 is a schematic block diagram of an example embodiment of a system 200 for use with the techniques described herein. In various embodiments, the system 200 may include client computing devices (e.g., desktop computers, notebook computers, netbook computers, tablet computers, smartphone, etc.) 202A, 202B, 202C. A client computing device 202A can include one or more processors 204 and one or more memories 206. The client computing device 202A can execute an operating system 208 and an application 210 that which may display a user interface window 212. The client computing device 202A can include a location detector 218, which may automatically detect a location of the computing device, for example, based on global positioning system (GPS) signals, or by triangulation of signals from transmitters at known locations, or by using other hardware and/or techniques. The client computing device 202A can include an installer engine 220 that can receive code for an application that is to be run on the client device 202A from a server and can install the code on the client device so that the application can be executed by the device.

In one embodiment, the client computing device 202A may be running or causing the operating system 208 to execute an application 210 or window 212. For purposes of illustration the window 212 is referred to as a web browser. However, it is understood that the above is merely one illustrative example to which the disclosed subject matter is not limited. In various embodiments, this window 212 may include a plurality of panes or tabs 214A, 214B, 214C. The window 212 can be a visual area, usually rectangular, containing some kind of user interface. In a graphical user interface (GUI) used in the client device 202A, the window 212 can be a two-dimensional object arranged on a plane of the GUI known as the desktop. The window 212 can include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individuals tabs 214A, 214B, 214C. These tabs 214A, 214B, 214C are typically displayed one at a time, and are selectable via a tab-bar which often resides above the contents of an individual window. That is, one selected tab 214A is "forward-facing" and displays information or content to a user in the window 212, with the content of other tabs 214B, 214C is "hidden."

The client computing devices 202A, 202B, 202C may receive online content from one or more server computing devices 230, 242, 250, 270, 280 that may be connected to the client device 202 through a network 290. Each of the client computing devices 202A, 202B, 202C can be connected to the network 290 through a local Internet Service Provider 292. The received online content can be processed and displayed in the window 212 (e.g., in a on a tab 214 of the window 212). For example, the window 212 can display a user interface of a marketplace for digital goods, similar to the user interface of the marketplace described herein, to a user. A user can interact with the displayed content, and an activity metadata generator 218 can monitor the user's interactions with the content and the performance of the application 210 and can generate activity metadata based on the user's interactions with the content and based on the performance of the application 210.

A location of the client computing device 202A can be determined based on a location associated with the ISP 292. For example, a known location of the ISP can be used as an approximation or as a proxy for the location of the client computing device 202A.

The client computing device 202A can communicate with a digital goods marketplace server 250 that provides a marketplace for digital goods to client computing devices 202A, 202B, 202C. The marketplace server 250 can include one or more processors 252 and one or more memories 254. The marketplace server 250 can execute an operating system 256 and various applications and services to provide functionality to the client computing devices. For example, in one implementation, the marketplace server 250 can include a repository for database of digital goods 258, and the digital goods can be served from, or downloaded from, the repository to the client computing devices. In another implementation, the digital goods can be stored in, and serve to client computing devices from, a repository that is remotely located from the marketplace server. For example, digital goods could be stored and served to client computing devices from individual repositories that are operated and controlled by developers of the digital goods, and digital goods repository 258 of the marketplace server 250 can provide just a reference to the individual repositories that are operated by the developers.

When the digital good, for example, a packaged web application that can be run offline (i.e., locally, with the client device 202A, without access to the network 290), is downloaded from the marketplace server 252 the client device 202A, the installer engine 220 can receive the downloaded digital good and install it for execution on the client device. For example, the installer engine can use browser extensions application programming interfaces (APIs) to integrate the web app with the browser, so that the web app can launched seamlessly within the browser application 210. Hosted web applications that can be run online, e.g., that are hosted by an online server that executes the application and serves content to the client device 202A through the network 290 for presentation to the user, also can be installed with the browser, by granting the hosted web app increased permissions to local resources on the client device. For example, installing the hosted app may include granting the hosted app permission to use unlimited local storage on the client device 202A or to access a user's browsing history, bookmarks, etc. that is stored on the client device 202A. Such permissions can be stored as part of the installation process for the hosted web app, so that the user need not re-grant these permissions each time the hosted web app is used.

The system 200 can include a developer client 242 with which a developer can develop applications or extensions or other digital goods to be uploaded to the marketplace server 250 for presentation in the marketplace server. The developer client 242 can include one or more processors 243, one a more memories 245 for storing data such as, for example, executable instructions and/or content, an operating system 244, and one or more applications 246 they can be executed by a developer to perform various tasks such as, for example, developing digital goods for presentation in the marketplace, receiving payments from the marketplace server 250, etc.

The marketplace server 250 can include a metadata database 260 that stores metadata associated with the digital goods that are available from or referenced by the digital goods repository 258. The metadata associated with a digital good can include a variety of information about the digital goods including, for example, information about the digital goods that are available from the repository 258. Such information can include, for example, representative keywords associated with the digital goods, the price associated with the digital goods. The metadata may also include demographic data about targeted users of the digital good, a time of year month or day during which the digital goods may be of the highest interest to a user, etc. For example, metadata associated with the surfing videogame may indicate that the good is intended for use by male users between the ages of 15 and 34, who live in coastal California or Hawaii, and that the game may be more popular during summer months than during winter months.

The marketplace server 250 can include query handler 262 that can be configured to receive and process queries for digital goods available in the marketplace. For example, the query handler can receive queries for digital goods that are entered into query box 126 of the user interface 100 shown in FIG. 1. Terms or phrases of the queries then can be compared to terms and phrases (e.g., terms and phrases stored in the metadata database 260) that are used to index the digital goods available in the marketplace. Based on the comparison, a subset of digital goods can be selected from the database 258 with which to respond to the query.

The marketplace server 250 can include a ranking engine 264 that is configured to rank digital goods based on signals relevant to the relative desirability of the goods to a user, where at least one of the signals is based on information that is generated outside the marketplace. For example, the goods can be ranked based on their price in the marketplace, but such a signal as price is generated within the marketplace because the prices are relevant only within the marketplace. However, as described herein, other signals can be generated outside the marketplace and used by the ranking engine to rank the relative desirability of goods to a user.

The marketplace 250 can include a presentation engine 266 that prepares information for transmission to the client computing devices 202A, 202B, 202C, where the information is used by the client computing devices to display a user interface 100 that shows representations of selected digital goods available in the marketplace. For example, based on the output of the ranking engine 264, the presentation engine 266 can prepare HTML code, XML code, etc. that determines the information that is displayed to a user in the user interface 100 and where the code determines which digital goods will be displayed in the user interface 100 to the user.

As discussed in more detail below, the marketplace server 250 can include a pricing engine 267 that can be used to determine various prices associated with digital goods that are presented in the marketplace. The marketplace server 250 also can include a payment engine 268 that can receive payments authorized by users that wish to purchase a digital good from the marketplace and that make payments to developers of the digital goods that are offered in the marketplace.

The ranking engine 264 can use a variety of signals to rank the relative desirability to the user of different digital applications available in the marketplace, where some of the signals can be based on information that is generated outside of the marketplace. In one implementation, the signals used by the ranking engine 264 can be based on how a web application available from the marketplace is used by a client computing device or how a web application performs when utilized by a client computing device.

In one implementation, a signal used by the ranking engine can be based on how often a digital good available from the marketplace is used on a client computing device 202A, 202B, 202C, after the digital good is downloaded from the digital goods repository 258 to the client computing device for execution on the client. For example, when a web application is downloaded from the repository 258 and is executed by a browser application 210 running on the client device 202A, the browser application can monitor each time the web application is launched within the browser and can report this information to the ranking engine 264. The ranking engine 264 then can rank the applications based on how often they are launched by client devices after they are downloaded. For example, an application that is launched frequently can be ranked higher than an application is launched less frequently.

The browser application 210 also can monitor and gather information about how often a user interacts with a web application after the web application has been downloaded from the digital goods database 258 and launched within a browser application 210 of the client computing device 202A.

For example, the browser application 210 can provide a window 212 that can include multiple tabs 214A, 214B, 214C where one tab can be front-facing while other tabs are hidden. The browser application 210 can monitor how often a web application that is launched in the browser is front-facing, as opposed to hidden, and this information can be provided to the ranking engine 264 to provide an indication of how often a user interacts with the web application. The ranking engine 264 then can rank with applications based on how frequently a user interacts with the applications after they are downloaded. For example, an application with which a user interacts frequently can be ranked higher than an application with which a user interacts less frequently.

In another implementation, a signal used by the ranking engine can be based on a rate at which a web application available from the marketplace crashes while being executed by a client computing device 202A, 202B, 202C. In one implementation, after downloading a digital good from the marketplace server 252 to the client computing device 202A, the digital good can be executed by an application 210, and the application can provide feedback to the marketplace server 250 about the performance of the digital good. For example, a web application can be downloaded from the digital goods database 258 and installed on the client computing device 202A for execution by a browser application 210. Then, the browser application can monitor the performance of the web application, and the frequency with which the web application crashes.

The information that is provided by an application 210 running on a client device to the marketplace server 250 (e.g., regarding how a web application is launched, how often the user interacts with a web application, how often a web application crashes, etc.) can be provided on an opt-in basis. In other words, such information may be provided from the client computing device 202A to the server 250 only if the user of the client device specifically authorizes the transmission of such information from the client to the server.

Because the browser application 210 can communicate easily over the network 290, the browser application can provide feedback to the ranking engine 264 of the marketplace server about the local usage of the web application on the client computing device. By receiving such feedback from many client computing devices 202A, 202B, 202C, the ranking engine 264 can gather a great deal of information about how an application is actually used after it is downloaded from the marketplace server 250. Thus, the ranking engine 264 has the ability to rank digital goods available from the marketplace server 250 based on signals relevant to the relative desirability of different applications to users, where such signals can include signals based on information about how applications are actually used, or how applications actually perform, after the applications are downloaded from the marketplace server 250 and installed on a client computing device. Moreover, by using signals that are automatically generated as the web applications are used, the ranking of the digital goods in the marketplace can be somewhat more objective than rankings based on subjective user reviews based on users' experience with the web application, which users may enter directly into the marketplace server 250 (e.g., by adding metadata information about a digital goods to the metadata database 260).

The above-described signals are but a few examples of signals based on information that is generated outside of the marketplace and that is relevant to the relative desirability to the user of different applications that are available from the marketplace. Other signals also can be used by the ranking engine 264.

In another implementation, signals based on information that is generated outside of the marketplace and that are used by the ranking engine 264 for ranking the relative desirability of digital goods available marketplace can include signals based on information provided by a search engine. For example, in one implementation, such signals can be based on recent trends in query terms received through a search engine.

As shown in FIG. 2, the system 200 can include a search engine server 230 that includes one or more processors 232, one or more memories 234, an operating system 236, a query handler 238, and a result server 240. The query handler 238 can receive queries that include one or more query terms or query phrases from client computing devices 202A, 202B, 202C, and a result server 240 can provide search results in response to the queries. The search engine server 230 can monitor the query terms and phrases received from client devices, and based on the query term traffic the search engine server 230 can generate statistics about trends in users' interests. For example, when a previously-unknown singer becomes a star entertainer, trends in query term traffic may reveal that users are becoming more interested in discovering information about the singer. Similarly, when a movie or a game becomes popular, trends in the search engine traffic received to the search engine server 230 can automatically reveal the increase in the popularity. In another example, search engine trends can be driven by seasonal factors, such as search queries for "costumes" rising in the weeks before Halloween, or queries for the purchase of products rising during the winter holiday season.

Such trends in query term traffic can be provided by the search engine server to the marketplace server 250, so that the ranking engine 264 of the marketplace server can rank digital goods available in the marketplace based on trends in query traffic. For example, the ranking engine 264 can boost or lower the relative ranking of individual digital goods available in the marketplace will 250 based on search engine traffic. Thus, for example, when search engine traffic reveals that a game or a movie is becoming popular, and such information is provided to the ranking engine 264, the ranking engine can boost the ranking of web applications that are related to the game or the movie.

In another implementation, signals based on information that is generated outside of the marketplace and that are used by the ranking engine 264 for ranking the relative desirability of digital goods available marketplace can include signals based on information provided by a social network applications or servers. For example, in one implementation, such signals can be based on how digital goods are used by acquaintances of a particular user, and the rankings performed by the ranking engine 264 can be based on such signals and can be specifically tailored for the particular user.

As shown in FIG. 2, the system 200 can include a social network server 270 that includes one or more processors to 272, one or more memories 274, an operating system 276, and a social network application 278. The social network application 272 can provide a network, environment, virtual world through which a particular user can interact with selected colleagues, friends, acquaintances (collectively, "friends") of the particular user. For example, the particular user can exchange information with his or her friends about interests that they may share. Thus, a user that downloads a digital good from the marketplace server 250 and installs and executes the digital goods within a client computing device controlled by the user may recommend the web application to the user's friends. Such recommendations pass through the social application 278, and anonymous information about such recommendations can be gathered by the social network server 270 and then passed on to the ranking engine 264. The ranking engine then can base its rankings of digital goods in the marketplace on statistical information about such recommendations. For example, the ranking engine 264 can boost the ranking of a web application that has received a large number of recommendations within the context of a social network application 278. In another example, the ranking engine 264 can boost a user-specific ranking of a web application when the web application has been recommended frequently within the context of a social network application by friends of the specific user to their friends.

The ranking engine 264 also can use other signals that are generated outside of the marketplace to generate rankings of digital goods available in the marketplace. In one implementation, the ranking engine 264 can provide rankings specific to a user of digital goods that are available within the marketplace, where the rankings are based in some way on information that is associated with the user and that is generated outside the marketplace. For example, a location associated with the user can be compared to metadata associated with digital goods, and the ranking engine 264 can provide rankings of digital goods based on such comparisons. A location of a user can be determined in a number of ways, including by the location generator 216 or based on a location associated with the ISP 292 through which the user's client device communicates with a network 290. The location of a user can be compared to metadata associated with digital goods so that the relevance of digital goods to the user can be ranked based on the user's location. For example, an application that calculates marine tides generally be of low relevance to a particular user who lives far from the coast, and accordingly should be ranked low for the titular user by the ranking engine. Thus, when information about the user reveals that the user lives or is located in Albuquerque N. Mex., then a marine tide web application that is associated with metadata indicating that the application is relevant to coastal users, would have a relatively low ranking for the user.

In another implementation, information associated with the user can include a browsing history of the user that provides information about content (e.g., websites) that the user has accessed through a browser application 210. Metadata about the accessed content, or the content itself, can be compared to metadata associated with digital goods available in the marketplace. Based on the comparison, the ranking engine 264 can provide rankings of the available digital goods to a user that are individually-tailored to the interests of the user, as determined from the browsing history of the user. For example, if the browsing history reveals that the particular user is primarily interested in playing computer or video games, then the ranking engine can boost the user-specific rankings of game applications that are available in the marketplace.

The information that is provided by an application 210 running on a client device to the marketplace server 250 (e.g., regarding a user's browsing history, etc.) can be provided on an opt-in basis. In other words, such information may be provided from the client computing device 202A to the server 250 only if the user of the client device specifically authorizes the transmission of such information from the client to the server.

Figure 3:
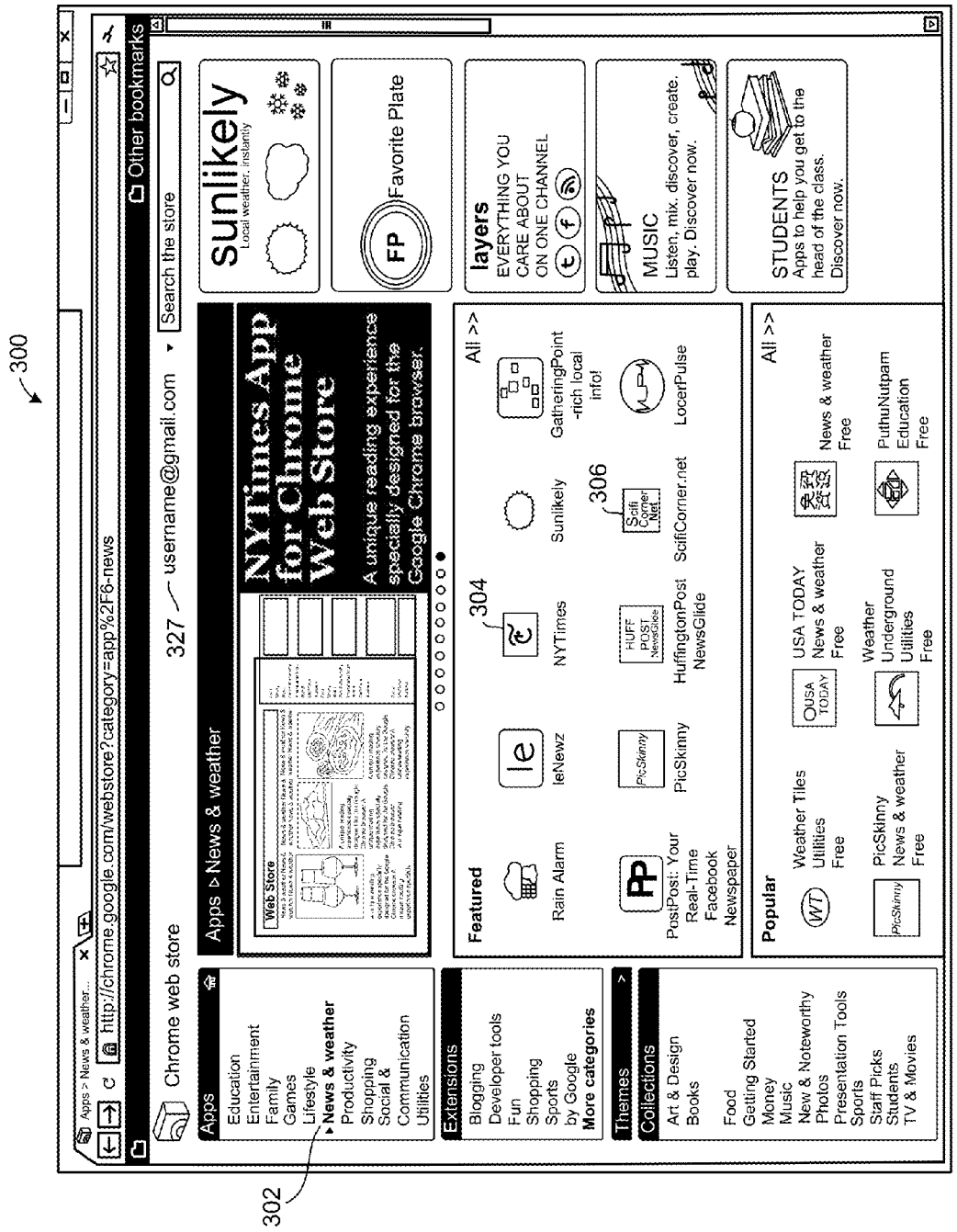
FIG. 3 is another screenshot of a user interface to a marketplace of digital goods.

FIG. 3 is another screenshot of the user interface 300 to a marketplace of digital goods. The presence of a username 327 in place of the hyperlink 127 that is selectable so that the user can enter login credentials indicate that a user has logged in to an account associated with the marketplace that is presented by the marketplace server 250. The account associated with the marketplace also can be associated with other online or local services or applications the user may use, which may be provided by a server 280 that includes one or more processors 282, one or more memories for storing data 284, one or more operating systems 286, and that can execute one or more applications or services 288. For example, the account associated with the marketplace also can be associated with the user's online e-mail account (e.g., Microsoft Hotmail, Yahoo mail, Google Gmail, etc.) the user's online social network account (e.g. Facebook, twitter, etc.), the user's online photo account (e.g., Snapfish, Shutterfly, Picasa, etc.), accounts at content websites (e.g., news websites game websites, entertainment websites, etc.), etc. By associating the user's marketplace account with other accounts of the user, information from the other accounts can be utilized, with the permission of the user, by the ranking engine 264 to provide user-specific rankings of digital goods available in the marketplace to the user. For example, selection of the "news and weather" hyperlink 302 can trigger the display of featured in popular web applications related to news and weather within the user interface 300.

The applications that have been selected for display in the user interface 300, and the position and order in which the selected applications are presented in the user interface, can be based on rankings of the applications provided by the ranking engine 264. For example, if the user has registered and opened an account with the website of the New York Times and that account is associated with the user's marketplace account 327, then the ranking engine 264 may boost the ranking of a web application 304 that is associated with the New York Times. If that user has not registered and opened an account with the Wall Street Journal, or if a user account with the Wall Street Journal is not associated with the user's marketplace account, then the ranking engine may boost the ranking of a web application associated with the New York Times 304 above the ranking of a web application associated with the Wall Street Journal for that particular user. Then, the web application associated with the New York Times 304 may be selected for display in the user interface 300 over a web application associated with the Wall Street Journal.

In another implementation, the ranking engine 264 may select an application 306 that provides news about science fiction related topics for display in the user interface 300 based on signals that are generated outside of the marketplace. For example, if the user's social network friends have downloaded and installed a web application related to science fiction news 306, the ranking engine 264 may boost the ranking of the web application 306. In another example, if the user's browsing history indicates that the user is interested in science fiction related information, the ranking engine 264 may boost the ranking of the web application 306.

Figure 4:
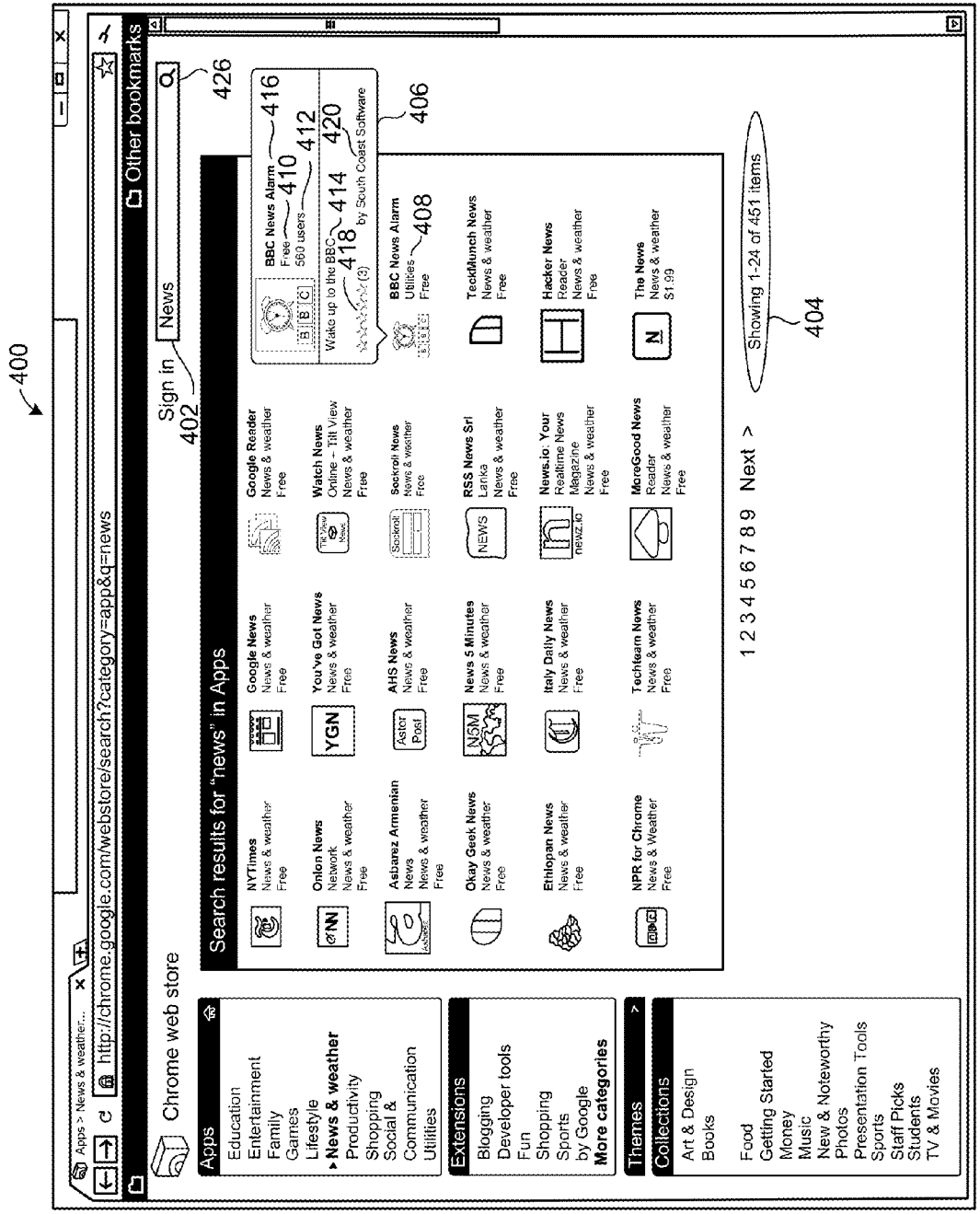
FIG. 4 is another screenshot of a user interface to a marketplace of digital goods.

FIG. 4 is a screenshot of the user interface 400 to a marketplace of digital goods. The screenshot is representative of a user interface that can be displayed when a user enters a query term "news" in query box 426 to search for web applications available in the marketplace that are related to news. The query term can be compared to metadata associated with digital goods, for example, metadata stored in metadata database 260. Based on the comparison, the query handler 262 can identify one or more digital goods that are related to the query term. The user interface 400 includes a display item 404 that indicates that a total of 451 web applications have been identified in the marketplace as relevant to the query term "news" and that 24 of the identified applications have been selected for display in the interface 400. The applications that are selected for display in the user interface can be selected based on a ranking of the relative desirability of the identified applications. Furthermore, among the selected subset of applications, the position of the applications within the user interface 400 can be determined by their ranking. For example, applications with higher rankings can be displayed in rows at the top of the user interface 400, and, within a row, applications with a higher ranking can be displayed on the left side of the row.

A pop-up HTML window 406 can be displayed when a user moves a mouse icon over an icon for an application 408 that is displayed in the user interface 400. Within the pop-up HTML window 406, additional information about the web application 408 can be displayed. For example a field 410 can indicate whether the application is free or the price that must be paid to be able to download and install the app. Another field 412 can indicate how many users have downloaded and/or installed and/or used the application. Information about the installation and/or use of the application on a client device can be transmitted from a browser executing the application of the client device to the marketplace server 250. Another field 414 can display descriptive information about the web application that supplements information in the title field 416. Another field 418 can display an average subjective rating that users have provided of the web application and a number of users that have rated the application. Another field 420 can display the name of the author or developer of the application.

The rankings can be determined based on a number of factors or signals, which may include signals that are generated within the marketplace and outside of the marketplace. For example, signals generated within the marketplace can include a relevance of a web application to the query term(s) 402 that are entered in the query box 426 (e.g., as determined by the query handler 262), user feedback of the web applications entered into the marketplace (e.g., by the user's providing comments on the web application or by ranking the application based on a 1-5 star system), or by the number of times an application has been downloaded from the marketplace.

For example, signals generated outside of the marketplace can include the number of times a web application has been launched by an application (e.g., a browser application) running on a client to which the application has been downloaded, the number of times a web application is crashed after it has been downloaded to a client device, how often an application is used after it is downloaded to a client device, how often an application is front facing after being launched by an application running on a client device to which the application has been downloaded, etc. In the example shown in FIG. 4, the NYTimes web application may be the highest ranked application of the 451 items that are responsive to the "news" query entered in the query box 426 and therefore can be displayed in the user interface in the top left corner of the interface. Other applications that are less highly ranked in the NYTimes application may be displayed elsewhere in the user interface or may not be displayed in the first group of 24 applications that are displayed in the interface shown in FIG. 4.

In another general aspect, the marketplace provided by the marketplace server 250 offers an improved "Freemium" experience to a user, though which free versions of web applications can be converted to paid versions of the application. For example, the marketplace can offer the unified display of "free" and "paid" aspects of a web application offered in the marketplace can provide for a mechanism for seamlessly upgrading the application from a "free" version to a "paid" version of the application and can provide easy entry points to free versions of applications to the users.

Figure 5:
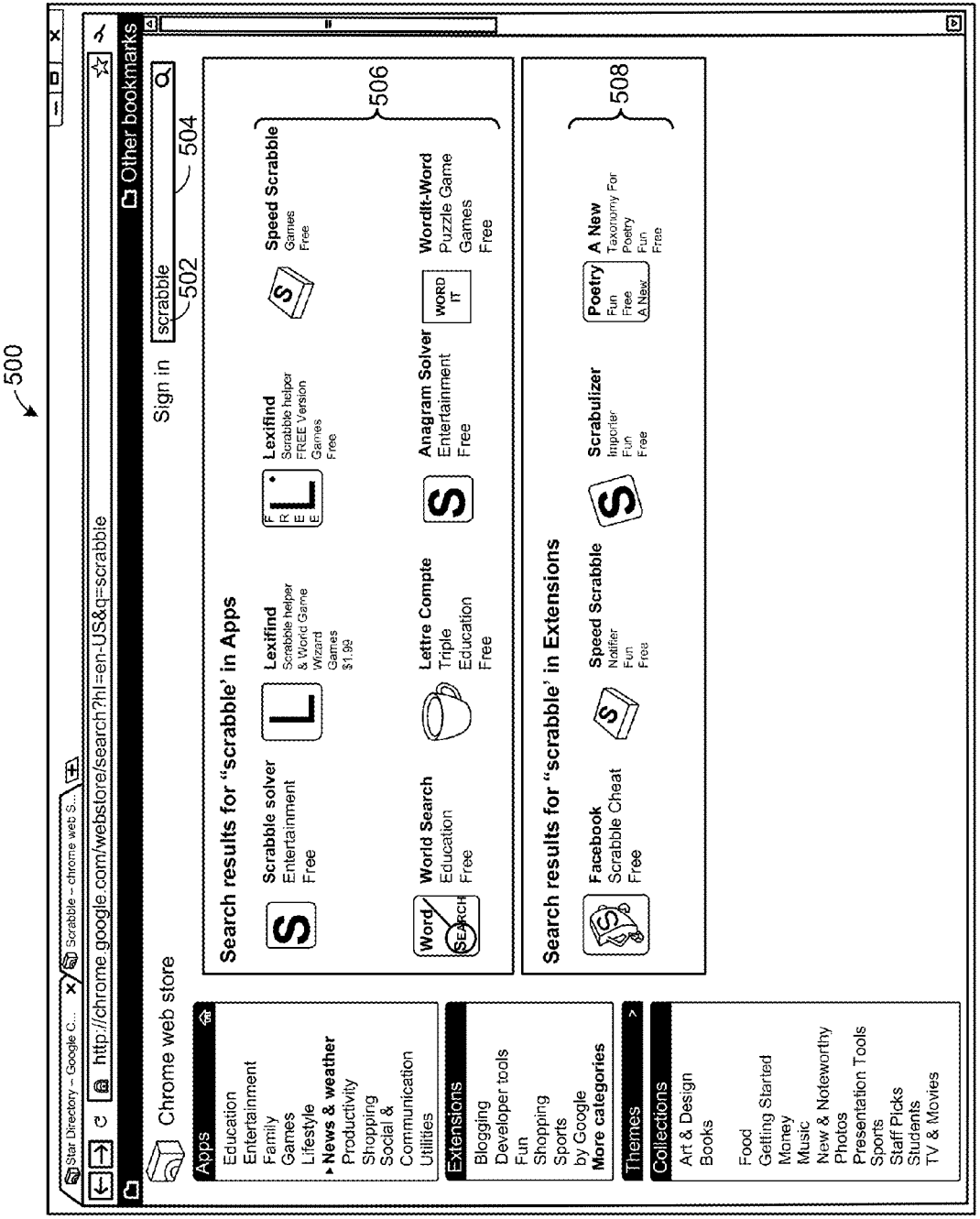
FIG. 5 is another screenshot of the user interface 500 to a marketplace of digital goods.

FIG. 5 is another screenshot of the user interface 500 to a marketplace of digital goods. As shown in FIG. 5, a user has entered the query term "Scrabble" 502 into query box 504, and in response to the query the query handler 262 has located a number of web apps 506 and extensions 508. The ranking engine 264 can rank the relative desirability of the individual web apps and extensions to the user, and the presentation engine 266 can send information to the client device 202A so that the client device can display the user interface 500 that shows the located web apps 506 and extensions 508 impositions determined by the ranking engine 264.

Among the web apps 506, are included a paid version of the web apps called "Lexifind Scrabble Helper & Word Game Wizard" 510 and a free version of the same web app 512. Each icon 510 and 512 can include a hyperlink, the selection of which will open a new page or tab that displays information about the free or paid version, respectively, of the application and it provides a further link to download and install the application. The free version and the paid version of the web app can be grouped into a single logical item within the marketplace for display search and browsing. Thus, for example, different icons 510, 512 representing the free and paid versions of the web app can be displayed next to each other in the user interface 500, so that they are always closely associated with each other. In another implementation, a single icon can represent both the free and paid versions of the application. In addition, metadata associated with the free and paid versions of the app can be defined to be sufficiently similar so that the query handler 262 responding to a query will rank the relevance of both the free and paid versions to the query identically or very similarly. Furthermore, the ranking engine 264 can rank the relative desirability of the free and paid versions of the application, compared to other applications, similarly, so that both the free and paid versions are displayed next to each other within the user interface 500.

Figure 6:
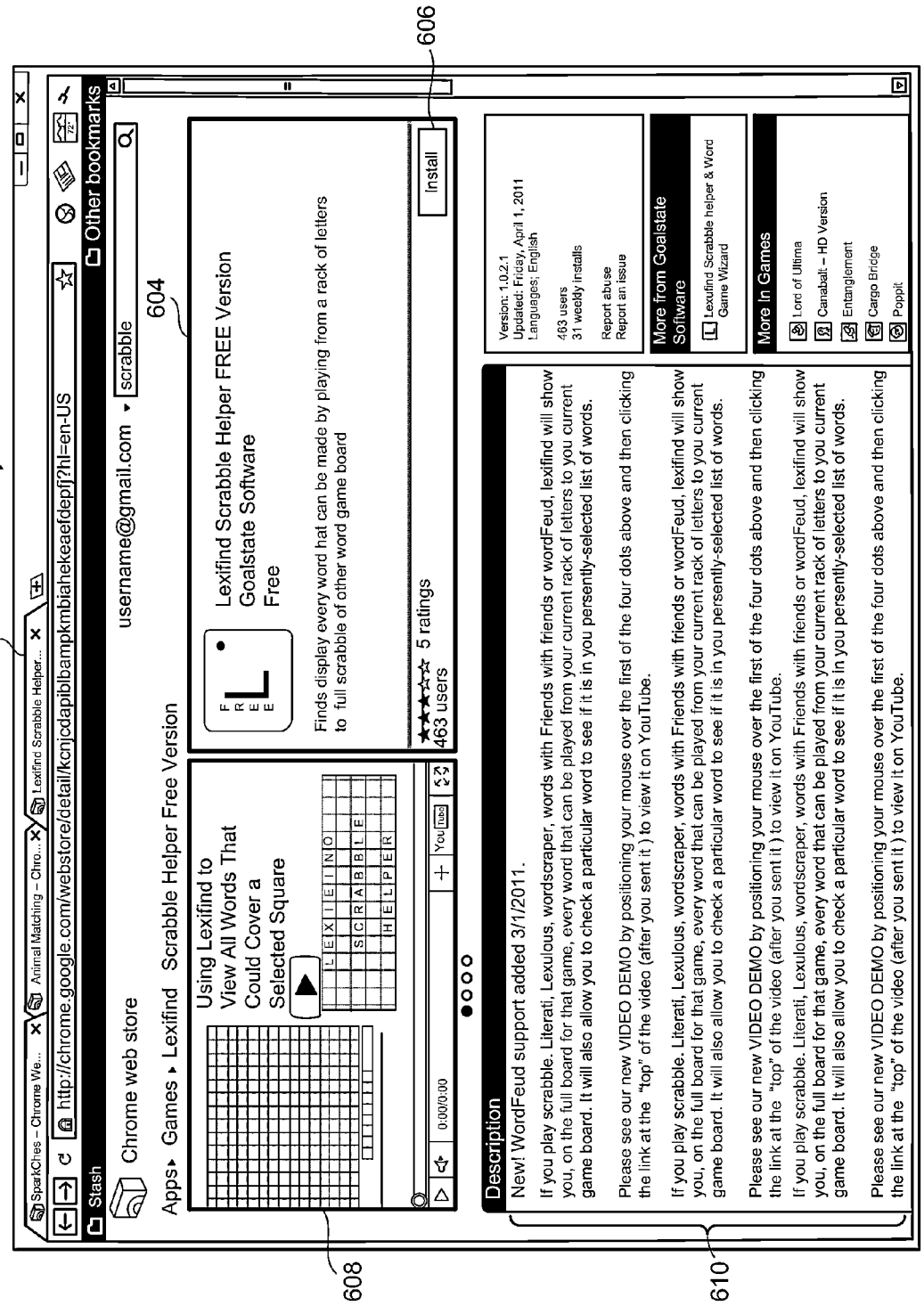
FIG. 6 is a screenshot of a user interface in which information about a free version of an application is displayed to a user within a marketplace for the application.

FIG. 6 is a screenshot of a user interface 600 in which information about the free version of the Lexifind Scrabble Helper application is displayed to a user within a marketplace for the application. The user interface 600 can be displayed in a new tab 602 that is opened after the icon 512 representing the free version of the Lexifind Scrabble Helper application is selected and user interface 500. The user interface 600 includes a portion 604 that provides a high-level description of the application and a link with which a user can install the application 606. The user interface 600 of the marketplace also includes a portion 608 with which the user can demo the application, and a portion 610 that provides a text description of the application. As described in the information shown in FIG. 6, the Lexifind Scrabble Helper application is an application that finds and displays every word that can be made by playing from a rack of letters to a full Scrabble or other word gameboard. As noted in the text description of the application 610, the free version of the web app can include all the core capabilities of the corresponding full or paid version of the application, except for some key features. For example, in the free or trial version of the application the number of rack letters that can be entered is limited to six letters, rather than seven letters as is generally used. Full Scrabble game. In another example, inability to specify that certain rack letters are to be played are retained is not included in the free version.

Figure 7:
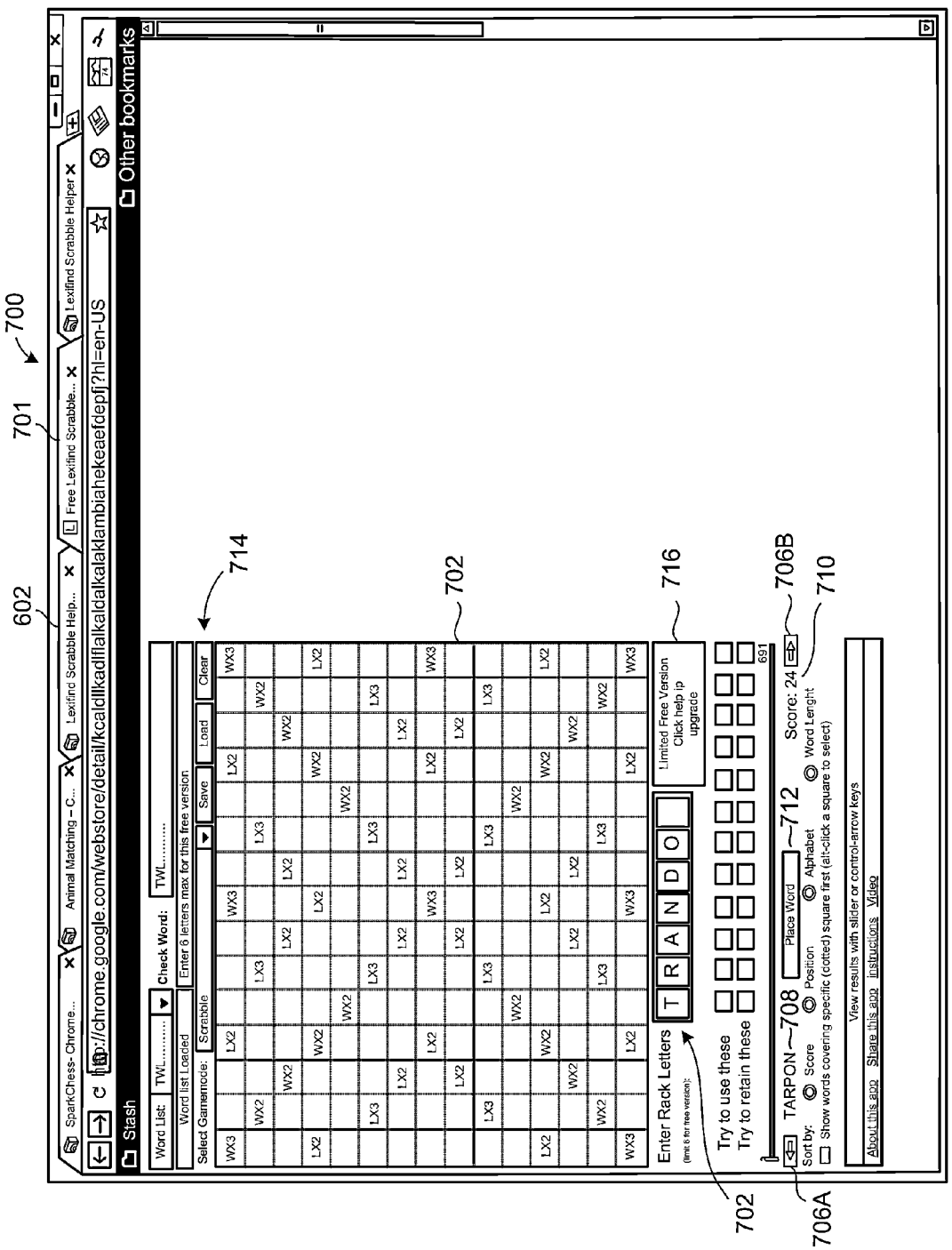
FIG. 7 is a screenshot of a user interface in which the application of FIG. 6 is executed.

FIG. 7 is a screenshot of a user interface 700 in which the Lexifind Scrabble Helper application is executed and can be displayed in a new tab 701 of the browser window. As can be seen from FIG. 7, the user interface provided by the application includes a virtual Scrabble board 702 and a virtual rack of letters 704. Buttons 706A, 706B can be selected by a user to scroll through a list of words that can be formed by the letters in the rack 704 when placed on the virtual Scrabble board 702.

A score that the word would receive when placed on the board and a full Scrabble game is also displayed. For example, the word tarpon 708 is the third highest scoring word that can be placed using the letters from the virtual rack 704 and the score 710 that would be received in a full Scrabble game for this word is 24. A button 712 can be selected to place the suggested word on the virtual board 702 and then the virtual rack 704 can be refilled with letters. As shown in capital FIG. 7, the app can include buttons 714 with which a user can save a game in progress, load a previously-saved game, or clear the letters on the board in the current game. Data about saved games can be stored locally on the user's client device, e.g. in memory 206.

In another implementation, data about saved games can be stored remotely on a network server associated with an online account of the user. For example, again referring to FIG. 2, data about what applications a user has installed, data about user settings associated with a web application from the marketplace, data about a state of a web application used by a user, and data generated through use of a web application can be stored within a memory device 254 of the marketplace server 250 or within another memory device operably connected to the marketplace server 250. In another implementation, data about user settings associated with a web application from the marketplace, data about a state of a web application used by a user, and data generated through use of a web application can be stored within a memory device 284 of a network server that is associated with the user's account that the user uses to access the marketplace marketplace provided by the server 250. For example, if the user uses a Google account to login to the marketplace, then the data could be stored within a memory of another network server 280 that is also associated with the user's Google account.

When the data associated with a user's interaction with a web application is stored on a network server, e.g. server 280, and is associated with an online account of the user, then when the user logs into his or her account from any client device 202A, 202B, 202C the data can be retrieved from the network server so that the web application can be utilized by the user from any of the client devices. For example, if the stored data indicates that a user has paid for and installed the paid version of an application, then the paid version of the application can be automatically installed on any client device from which the user logs into his or her online account. Thus the web application can be "synced" across client devices that the user uses to log into his or her account.

Referring again to FIG. 7, although in a real Scrabble game seven letters are used in the rack of letters, and the free version of the web that that is shown in FIG. 7 only six letters can be placed in the virtual rack 704 and used to form words in the virtual Scrabble board 702. This limited functionality may be enough to allow the user to understand how the application works and what its utility is, that may entice the user to upgrade to the full, paid version of the app so that the user can simulate a real Scrabble game. The free version of the application can include one or more links 716 that can be selected by the user to upgrade to the full version of the application. Selection of the link 716 can take the user back to the marketplace provided by the marketplace server 250 so that the user can purchase and install the paid version of the application.

Figure 8:
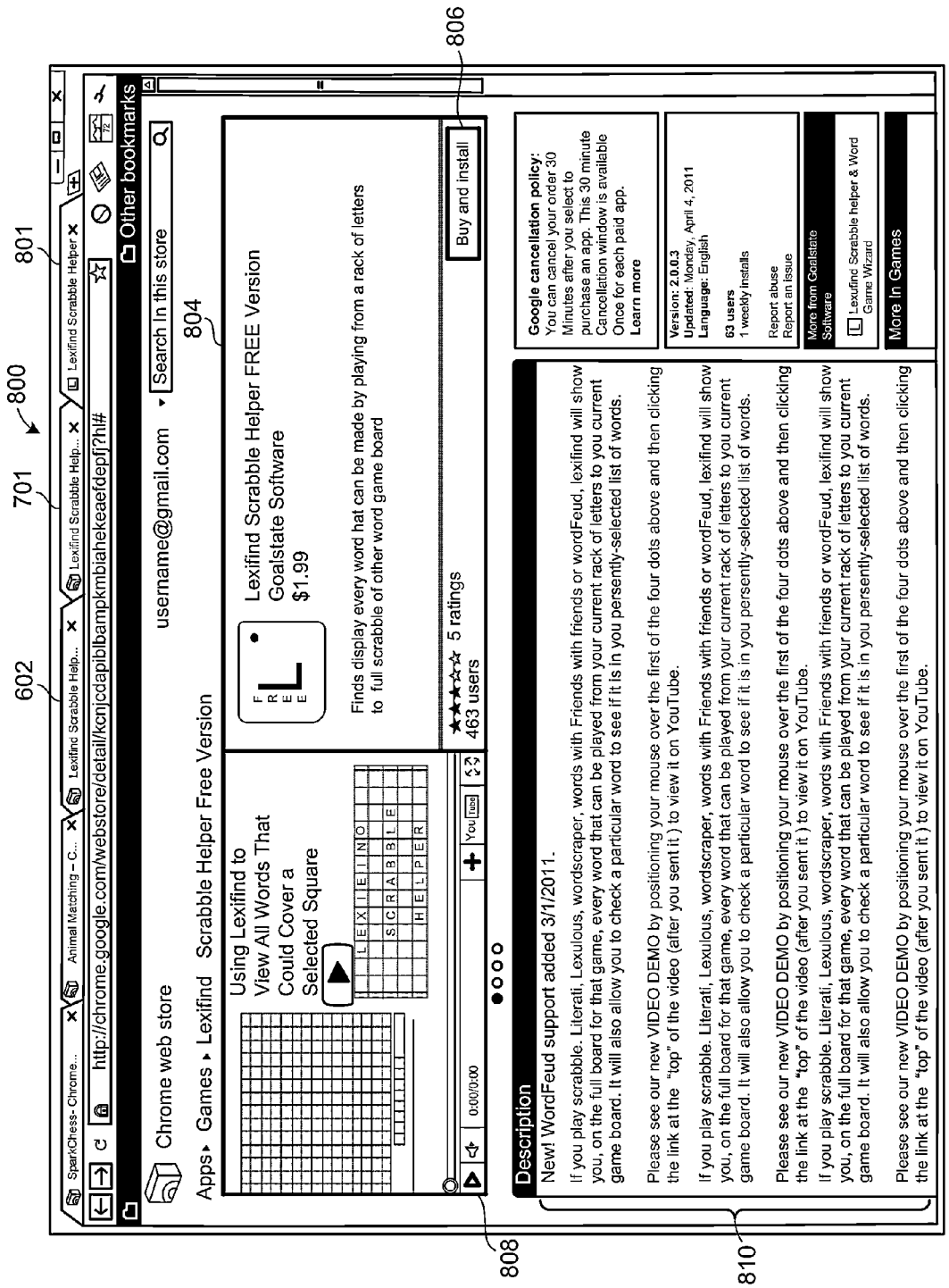
FIG. 8 is a screenshot of a user interface that may be presented to the user upon selection of a link within an executing application and within which a user may purchase and install a full, paid version of the application.

For example, FIG. 8 is a screenshot of a user interface 800 that may be presented to the user upon selection of the link 716 and within which the user may purchase and install the full, paid version of the Lexifind Scrabble helper application. The user interface 800 provides information about the paid version of the Lexifind Scrabble Helper application. The user interface 800 can be displayed in a new tab 801 that is opened after the link 716 of is selected and user interface 700. The user interface 800 includes a portion 804 that provides a high-level description of the application and a link with which a user can purchase and install the application 806. The user interface 800 of the marketplace also includes a portion 808 with which the user can demo the application, and a portion 810 that provides a text description of the application. As described in the information shown in FIG. 8, the purchase of the paid application can be canceled, and the purchase price of the application can be refunded to the user, within 30 minutes of installing the application.

In another implementation, selection of the link 716 can open a user interface within the user interface 700 of the application within which the user can pay for and install the paid version of the application.

Installation of a paid version of an application can automatically associate data associated with the user's previous interaction with a free version of the application that has been previously saved, where the data may have been saved either locally on a client device or remotely on a network server device. For example, after the user pays for the paid version, the installer engine 220 can receive information about the paid version of the application from the presentation engine 266 of the marketplace server 250. Installer engine 220 can retrieve data that was previously-stored about interactions of the user with the free version of the application, and can import the retrieved information into the paid version of the application during the installation process.

Furthermore, data may be stored to indicate that the user has upgraded from the free to the paid version of the application, and this data may be synced across all client devices that a user may use to log into his online account associated with the stored data. The user may then use the paid version of the application from a particular client device, even if the particular client device was not used to pay for and initially install the paid version of the application.

Figure 9:
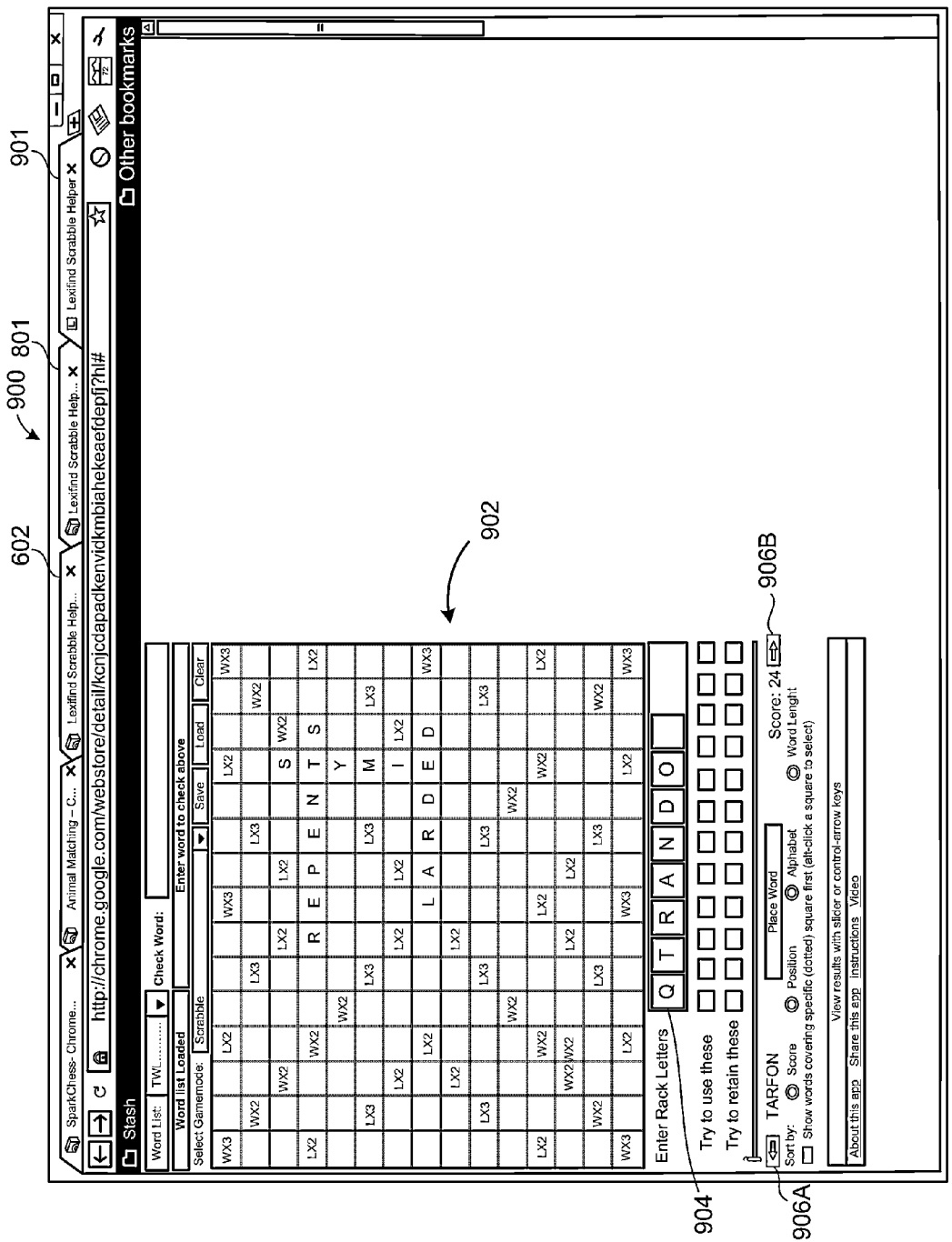
FIG. 9 is a screenshot of a user interface in which the free version of the application is executed.

FIG. 9 is a screenshot of a user interface 900 in which the free version of the Lexifind Scrabble Helper application that is executed and can be displayed in a new tab 901 of the browser window. Such a user interface 900 may be displayed to the user after the user has paid for and installed the free version of the application. As can be seen from FIG. 9, the user interface provided by the application is nearly identical to the interface provided by the free version of the application, in that it includes a virtual Scrabble board 902, a virtual rack of letters 904, and buttons 906A, 906B that can be selected by a user to scroll through a list of words that can be formed by the letters in the rack 904 when placed on the virtual Scrabble board 902. As can be seen from a comparison of the virtual Scrabble board 902 and the virtual Scrabble board 702, the letters displayed in the two virtual boards is identical. This can be the case because when the installer engine 220 installs the paid version of the application, the previously saved data about the user's interaction with the free version of the application can be imported into the paid version. Thus, the state associated with the free version and any user settings that have been saved can be immediately and automatically associated with the paid version when the paid version is installed. Because of this, when the paid version is installed, it can immediately render the same state of the game that the user had previously been viewing when the user was using the free version. In addition, when the paid version is installed the installer engine 220 can automatically associate data about any games that the user saved while using the free version with the paid version, so that the paid version automatically has immediate access to the saved games.

It should be understood that the specific example of the Lexifind Scrabble Helper application is but one specific example used to illustrate the general techniques described herein. Many other implementations are also possible. For example, a game web application may include a number of different levels in the game, where the paid version of the game application includes more levels than the free version of the application. Proceeding to a later level of the game may only be allowed after successful completion of an earlier level, and information about the levels that a user has completed may be stored when the user plays the game. Upgrading from the free version of the game application to the paid version of the application can include automatically associating with the paid version upon installation of the paid version, data about the number of levels that have been successfully completed by the user in the free version of the game.

In another implementation, a productivity application may include multiple features, but the paid version of the application may include more features than the free version. Use of the productivity application may generate data for the benefit of the user, and the may be stored. Upgrading from the free version of the application to a paid version may automatically associate the stored data with the paid version.

In another implementation, a paid version of a content providing application may provide more content than a free version of the same application. For example, a comic book application may provide a limited number of pages of a book to a user that is using a free version of the application, and may provide all of the pages to the user after the user has upgraded to the paid version of the application.

In another general aspect, the marketplace provided by the marketplace server 250 provides mechanisms and techniques to incentivize merchants and developers to gain many of the advantages of a "reseller" environment while preserving many of the benefits of acting as a "marketplace." For example, the marketplace of the marketplace server 250 can help to mitigate tax concerns of merchants, can help to mitigate foreign-exchange concerns of merchants, and can mitigate liability concerns of the marketplace provider.

Referring again to FIG. 2, the marketplace server 250 includes a pricing engine 267. When a merchant (e.g., a developer) of a digital good offered for sale in the marketplace) with the digital good for sale in the marketplace and set the price for the good, the pricing engine 267 can determine one or more derivative prices associated with the digital goods, where the derivative prices are derived from the price of the goods set by the merchant. For example, the pricing engine 267 can determine a sales tax price for the good based on the price set by the merchant. In another example, when the merchant sets the price of the digital good in a first currency the pricing engine 267 can determine a price of the digital good in a second currency based on the price set by the merchant.

The marketplace server 250 can receive or request from a party to the marketplace to list a digital good for sale in the marketplace. For example the marketplace server can receive or request from a developer's client device 242 to list a web application or browser extension for sale in the marketplace. The pricing engine 267 of the marketplace server 250 can receive a primary price associated with the digital good to be sold in the marketplace. The marketplace operator may require that the primary price equal to or higher than a minimum price, for example $1.99, as a condition of listing the digital good in the marketplace.

When the digital good is sold to a customer in the marketplace, the price charged to the customer can include one or more derivative prices based on the primary price. For example, sales tax that is determined based on the primary price may be charged to the customer, and the sales price may be part of the price that is charged to the customer. The pricing engine 267 can determine a sales tax for the digital good based on a variety of inputs. For example, the pricing engine may receive information from the client device 202A regarding a location, a shipping address, a payment billing address of the customer, and the pricing engine 267 may automatically determine a relevant jurisdiction for the transaction based on the received input. In addition, the pricing engine may refer to tax tables that list the relevant sales tax amounts or percentages or algorithms for different jurisdictions to determine the actual sales tax that should be charged for a particular transaction. The sales tax tables may be stored in the pricing database 269 within the marketplace server 250, or the sales tax tables may be stored in remote servers accessible through the network 290. Then, the pricing engine 267 can automatically determine the sales tax that should be charged for a particular transaction based on a variety of information inputs such as, for example, the primary price for the digital good, the relevant jurisdiction pertinent to the sales tax calculation, and sales tax amounts for the relevant jurisdiction.

Then, when a good is presented for sale to a customer within the marketplace the price of the good can include the required sales tax or other such derivative rights price. By allowing the marketplace operator to calculate the sales tax, and other such derivative prices, for a good and to include the derivative prices in the price of goods offered to a customer, the marketplace operator can provide a consistent and uniform experience to a customer. For example, rather than having each merchant that offers goods for sale in the marketplace determine whether and how they will collect sales tax on transactions, which may lead to considerable variability between merchants and a confusing user experience, the marketplace operator collect sales tax in a uniform manner to improve the user's experience.

By automatically calculating the sales tax for transactions that occur within the marketplace, the marketplace operator can significantly reduce the accounting and recordkeeping burden on a merchant that offers goods for sale in the marketplace. The marketplace server 250 can maintain a record of transactions involving goods offered for sale by a particular merchant, sales tax amounts charged for each transaction, and the relevant jurisdiction of each transaction. Then, the marketplace operator can provide reports to the merchant with such information, to facilitate compliance of sales tax laws for the merchant. For example, the marketplace operator can provide reports to the merchant listing sales by date (e.g. by month, quarter, year, etc.), by relevant tax jurisdiction (e.g. country, state, county, municipality), and the sales tax collected for the transactions. This may facilitate the reporting of sales tax receipts by the merchant, because the reports may include a single line indicating the amount of sales tax that must be paid to a particular jurisdiction for a particular reporting period. The marketplace operator may charge a fee for providing such reports to a merchant, and the fee may depend on such factors as the nature, complexity, detail, and length of the report.

Similarly, the pricing engine 267 may determine a price for a digital good in a second currency when the merchant lists the primary price for the good in a first currency. For example, a merchant may list a primary price for a digital good in US dollars, but the good may offered for sale in the marketplace to customers who prefer to see prices in other currencies. For example, the marketplace may be a worldwide marketplace that offers goods to customers that prefer to pay for the goods in a variety of different currencies.

The pricing engine 267 may convert the primary price listed by the merchant in a first currency into a derivative price in a second currency. The derivative price in the second currency can be based on a variety of factors, for example the conversion of the primary price to the derivative price in the second currency can be based on a current exchange rate between the first and the second currency. In one implementation, the price in the second currency can be equal to the primary price multiplied by the critics change rate between the first and second currency rounded to the least significant digits in the second currency. For example, if the first currency is US dollars and the second currency is euros in the exchange rate between dollars and euros is 1.4293, then if the primary price is $2.99 the derivative price can be $2.99/1.4293=€2.03.

However, to provide for a more uniform user experience when the customer uses the marketplace, prices in the second currency can be forced to conform to certain conventions, such as all ending in "0.99", "0.49", or "0.00". Thus the pricing engine 267 can convert the primary price in a first currency to a derivative price in a second currency in such a manner that the price in the second currency is based on the primary price and the current exchange rate between the first and second currencies, subject to the constraint that the price in the second currency must end in "0.99", "0.49", or "0.00". In other words, an absolute value between a difference between the primary price in the first currency divided by the current exchange rate between the first and second currencies and the derivative price the second currency can be greater than a least significant digit in the derivative price.

Tables of current exchange rates between different currencies can be maintained in the pricing database 269 of the marketplace server 250, and the exchange rate information can be updated automatically either periodically or in real-time (e.g., at the time of a sale of a digital good in the marketplace close parentheses). The exchange rate information can be downloaded to the pricing database 267 from external servers that are in communication with the marketplace server 250 through the network 290. The pricing engine 267 can automatically determine a secondary currency that should be used for the sale of a digital good to a customer based on a variety of signals. For example, the user's online account associated with the marketplace can indicate a preferred currency for transactions, and this information can be provided to the pricing engine 267. In another example the pricing engine 267 can determine a secondary currency based on the location of the client device 202A used by the user to connect to the marketplace server 250, based on the billing address associated with the customer, or based on the shipping address to which the digital goods should be shipped.

The marketplace server 250 can include a payment engine 268 that can handle payments from a customer (e.g., using a client 202A to two purchase and install a digital good from the marketplace) and payments to a developer of the digital good that offers the purchase good for sale in the marketplace. The payment engine 267 can receive money in exchange for a digital good when a user authorizes payment for the good. For example, the user's online account associated with the marketplace can also be associated with an account of the user that a financial institution (e.g. bank, credit card company, etc.), and the user can authorize the transfer of money from the financial institution to the marketplace in exchange for the ability to download and install the digital good.

The payment engine 268 can coordinate the payment to a merchant that sells the digital good in the marketplace (e.g., a developer of the digital good), and the payment can be based on the primary price of the digital good. For example, the payment engine 268 can pay to the merchant the percentage of the primary price for which the digital goods sold, or can pay to the merchant the primary price minus a fixed transaction for each sale of the digital good or can pay to the merchant a combination of a percentage of the primary price and the primary price minus a fixed transactions fee. In one implementation, the amount paid to the merchant can be equal to the primary price minus [0.05×(primary price−transaction fee)+transaction fee]. The payment can be made by initiating an automatic transfer from a financial institution account associated with the marketplace to a financial institution account associated with the merchant. The payment engine 268 also can pay certain derivative prices associated with the sale of a digital good to the merchant. For example, if the price that a consumer pays for the good includes sales tax, the sales tax that is collected by the payment engine 268 of the marketplace can be paid to the merchant by the marketplace.

An operator of the marketplace they preferred that merchants participate in the services offered by the marketplace (e.g., determining, charging, and collecting sales tax or determining prices in foreign currencies), so that the user receives a more uniform and better experience within the marketplace, which may be more similar to a "reseller" environment that to a "marketplace" environment. However, to avoid liability associated with operating as a seller of record, the marketplace operator may not want to assert total control over the pricing of transactions within the marketplace. Therefore, the operator of the marketplace may wish to offer such services purely on an opt-in basis to merchants are other parties associated with the marketplace, so that legally the merchant remains the seller of record, but so that the user can receive a more uniform experience within the marketplace.

To encourage merchants who sell goods within the marketplace to opt into the services offered by the marketplace operator, the operator can provide certain incentives to the merchants to participate in such services. For example, the marketplace operator can offer to share a greater amount of the revenue received from a customer of a digital good with the merchant if the merchant opts to participate in the merchant services. In one implementation, the marketplace operator can offer to charge the user merchant a lower transaction fee if the merchant agrees to participate in the services offered by the marketplace operator. In another implementation, the marketplace on operator can offer to share a greater proportion of the purchase price paid by a customer for digital good if the merchant agrees to participate and the services offered by the marketplace operator. In another implementation, the marketplace operator can offer to charge a lower fee for reports provided by the merchant (e.g., sales tax reports), or could provide such reports for free, if the marketplace operator agrees to participate and the services offered by the marketplace operator.

The marketplace operator can also offer nonmonetary incentives to merchant. For example, the marketplace operator can offer to boost the rankings of digital goods offered by a merchant in the marketplace if the merchant agrees to participate in the services offered by the marketplace operator, so that the goods offered by the merchant will have a greater probability of being shown to customers then goods offered by merchants who do not agree to participate in the services offered by the marketplace operator.

Figure 10:
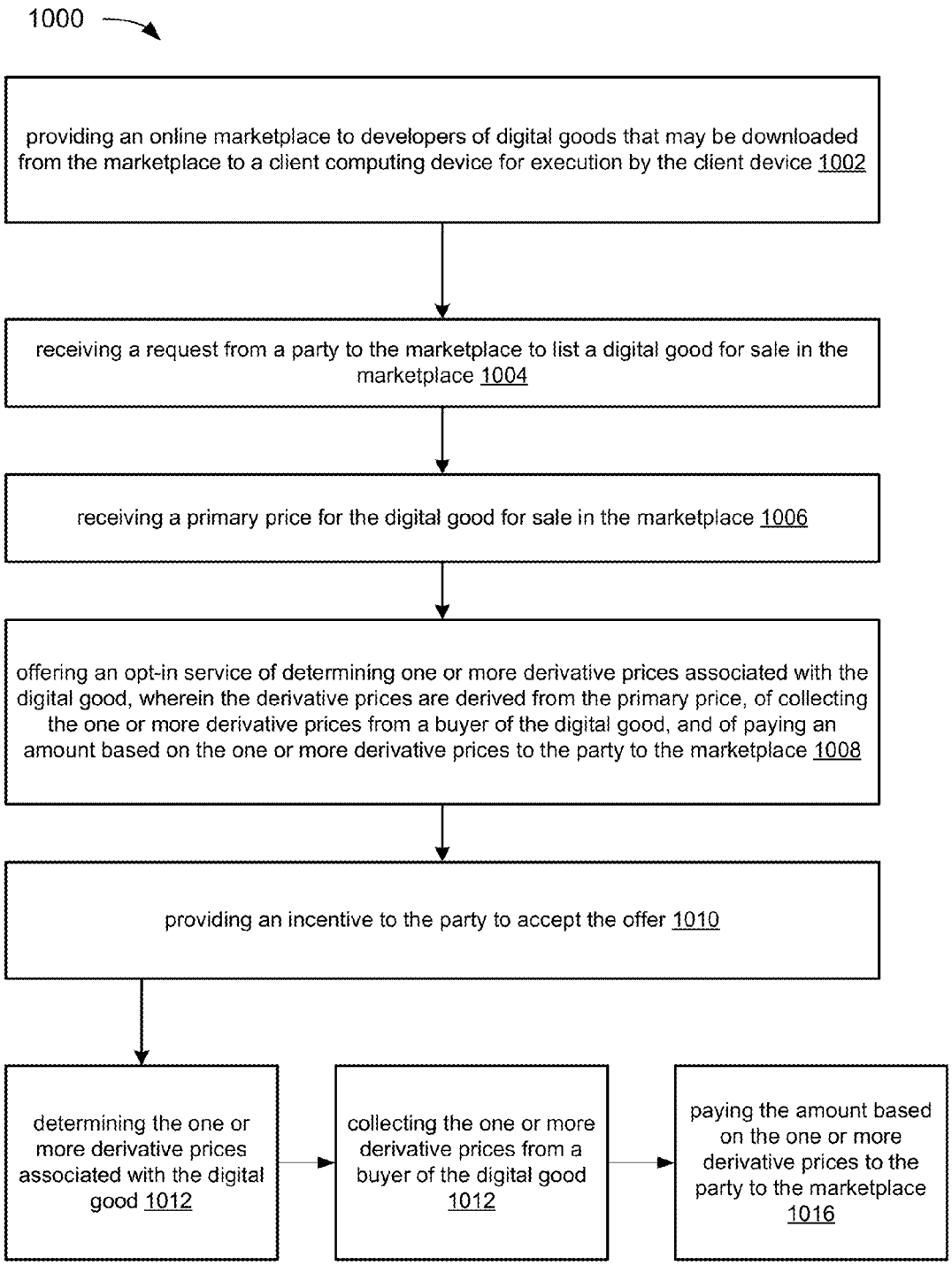
FIG. 10 is a flowchart of a process that implements techniques described herein.

FIG. 10 is a flowchart of a process 1000 that implements techniques described herein. In the process 1000, an online marketplace is provided to developers of digital goods that may be downloaded from the marketplace to a client computing device for execution by the client device (1002). A request is received from a party to the marketplace to list a digital good for sale in the marketplace (1004). The party to the marketplace can include a developer, a merchant or another person or entity. A primary price for the digital good for sale in the marketplace is received (1006).

An opt-in service is offered, wherein the opt-in service includes determining one or more derivative prices associated with the digital good (where the derivative prices are derived from the primary price), collecting the one or more derivative prices from a buyer of the digital good, and paying an amount based on the one or more derivative prices to the party to the marketplace (1008). In some implementations, the derivative price can include a sales tax or a price in a second currency other than a first currency of the primary price. The price in the second currency (P2) can be based on the primary price (P1) and a current foreign exchange conversion rate between the first and second currency (R), where an absolute value of a difference between P2 and R*P1 is greater than a significant digit used in prices of the second currency. In some implementations, the last two digits of the price in the second currency can be determined to be "99" or "49." In some implementations, at least one of the one or more derivative prices can be based, at least in part, on prices of other digital goods offered in the marketplace.

An incentive is provided to the party to accept the offer (1010), where the incentive can includes offering to boost a ranking of the digital good in the marketplace, or offering to pay a higher percentage of the primary price to the party or a higher percentage of the one or more derivative prices to the party when the digital good is sold in the marketplace.

After acceptance of the offer by the party, the one or more derivative prices associated with the digital good are determined (1012), the one or more derivative prices are collected from a buyer of the digital good (1014), and the amount based on the one or more derivative prices is paid to the party to the marketplace (1016).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. In some implementations, a computer-readable storage medium can store instructions that when executed can cause a processor (e.g., a processor of a mobile device, a processor of a host device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Process steps may be performed by one or more programmable processors executing a computer program to perform functions by operating on input data and generating output. Process steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method comprising:
providing an online marketplace to merchants of digital goods that may be downloaded from the marketplace to a client computing device for execution by the client device;

receiving a request from a party to the marketplace to list a digital good for sale in the marketplace;

receiving a primary price for the digital good for sale in the marketplace;

offering an opt-in service that includes: determining one or more derivative prices associated with the digital good, wherein the derivative prices are derived from the primary price; collecting the one or more derivative prices from a buyer of the digital good; and paying an amount based on the one or more derivative prices to the party to the marketplace;

providing an incentive to the party to accept the offer of the service; and after acceptance of the offer by the party:

determining the one or more derivative prices associated with the digital good;

collecting the one or more derivative prices from a buyer of the digital good; and paying the amount based on the one or more derivative prices to the party to the marketplace.

2. The method of claim 1, wherein a derivative price includes a sales tax.

3. The method of claim 1, wherein a derivative price includes a price in a second currency other than a first currency of the primary price.

4. The method of claim 1, wherein the price in the second currency (P2) is based on the primary price (P1) and a current foreign exchange conversion rate between the first and second currency (R) wherein an absolute value of a difference between P2 and R*P1 is greater than a significant digit used in prices of the second currency.

5. The method of claim 4, wherein the last two digits of the price in the second currency are "99" or "49."

6. The method of claim 1, wherein providing an incentive to the party to accept the offer includes offering to boost a ranking of the digital good in the marketplace.

7. The method of claim 1, wherein providing an incentive to the party to accept the offer includes offering to pay a higher percentage of the primary price to the party or a higher percentage of the one or more derivative prices to the party when the digital good is sold in the marketplace.

8. The method of claim 1, wherein at least one of the one or more derivative prices is based, at least in part, on prices of other digital goods offered in the marketplace.

9. A tangible, non-transitory computer-readable storage medium having recorded and stored thereon instructions that, when executed by one or more processors of a computer system cause the computer system to:

provide an online marketplace to merchants of digital goods that may be downloaded from the marketplace to a client computing device for execution by the client device;

receive a request from a party to the marketplace to list a digital good for sale in the marketplace;

receive a primary price for the digital good for sale in the marketplace;

offer an opt-in service that includes: determining one or more derivative prices associated with the digital good, wherein the derivative prices are derived from the primary price; collecting the one or more derivative prices from a buyer of the digital good; and paying an amount based on the one or more derivative prices to the party to the marketplace;

provide an incentive to the party to accept the offer of the service; and after acceptance of the offer by the party:

determine the one or more derivative prices associated with the digital good;

collect the one or more derivative prices from a buyer of the digital good; and pay the amount based on the one or more derivative prices to the party to the marketplace.

10. The tangible computer-readable storage medium of claim 9, wherein a derivative price includes a sales tax.

11. The tangible computer-readable storage medium of claim 9, wherein a derivative price includes a price in a second currency other than a first currency of the primary price.

12. The tangible computer-readable storage medium of claim 11, wherein the price in the second currency (P2) is based on the primary price (P1) and a current foreign exchange conversion rate between the first and second currency (R) wherein an absolute value of a difference between P2 and R*P1 is greater than a significant digit used in prices of the second currency.

13. The tangible computer-readable storage medium of claim 12, wherein the last two digits of the price in the second currency are "99" or "49."

14. The tangible computer-readable storage medium of claim 9, wherein providing an incentive to the party to accept the offer includes offering to boost a ranking of the digital good in the marketplace.

15. The tangible computer-readable storage medium of claim 9, wherein providing an incentive to the party to accept the offer includes offering to pay a higher percentage of the primary price to the party or a higher percentage of the one or more derivative prices to the party when the digital good is sold in the marketplace.

16. The tangible computer-readable storage medium of claim 9, wherein at least one of the one or more derivative prices is based, at least in part, on prices of other digital goods offered in the marketplace.

17. A system comprising:

one or more memory devices arranged and configured to store executable code; and one or more processors operably coupled to the one or more memory devices, the processors being arranged and configured to execute the code such that the apparatus performs the actions of:

providing an online marketplace to merchants of digital goods that may be downloaded from the marketplace to a client computing device for execution by the client device;

receiving a request from a party to the marketplace to list a digital good for sale in the marketplace;

receiving a primary price for the digital good for sale in the marketplace;

offering an opt-in service that includes: determining one or more derivative prices associated with the digital good, wherein the derivative prices are derived from the primary price; collecting the one or more derivative prices from a buyer of the digital good; and paying an amount based on the one or more derivative prices to the party to the marketplace;

providing an incentive to the party to accept the offer of the service; and after acceptance of the offer by the party:

determining the one or more derivative prices associated with the digital good;

collecting the one or more derivative prices from a buyer of the digital good; and paying the amount based on the one or more derivative prices to the party to the marketplace.

18. The system of claim 17,
wherein a derivative price includes a price in a second currency other than a first currency of the primary price, and
wherein the price in the second currency (P2) is based on the primary price (P1) and a current foreign exchange conversion rate between the first and second currency (R) wherein an absolute value of a difference between P2 and R*P1 is greater than a significant digit used in prices of the second currency.

19. The system of claim 18, wherein the last two digits of the price in the second currency are "99" or "49."

20. The system of claim 17, wherein providing an incentive to the party to accept the offer includes offering to boost a ranking of the digital good in the marketplace.

* * * * *